(12) United States Patent
Lee

(10) Patent No.: US 12,001,712 B2
(45) Date of Patent: Jun. 4, 2024

(54) STORAGE DEVICE FOR AUTONOMOUS DRIVING AND OPERATING METHOD THEREOF

(71) Applicant: SAMSUNG ELECTRONICS CO., LTD., Suwon-si (KR)

(72) Inventor: Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/883,214

(22) Filed: Aug. 8, 2022

(65) Prior Publication Data

US 2023/0153022 A1 May 18, 2023

(30) Foreign Application Priority Data

Nov. 17, 2021 (KR) .................. 10-2021-0158932
Mar. 31, 2022 (KR) .................. 10-2022-0040207

(51) Int. Cl.
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC .... G06F 3/0604; G06F 3/0619; G06F 3/0635; G06F 3/0637; G06F 3/0655; G06F 3/0679; G06F 3/0688
See application file for complete search history.

(56) References Cited

U.S. PATENT DOCUMENTS

| 10,606,767 | B2 | 3/2020 | Olarig et al. |
| 10,614,639 | B2 | 4/2020 | Iwaasa |
| 10,616,767 | B2 | 4/2020 | O'Gorman et al. |
| 10,846,955 | B2 | 11/2020 | Golov |
| 10,860,227 | B2 | 12/2020 | Jin et al. |
| 10,990,381 | B2 | 4/2021 | Aue et al. |
| 2016/0147482 | A1* | 5/2016 | Jang ..................... G06F 12/0246 711/103 |
| 2016/0342465 | A1* | 11/2016 | Cudak .................. G06F 3/0688 |
| 2020/0043254 | A1 | 2/2020 | Hase et al. |
| 2020/0250901 | A1 | 8/2020 | Golov |
| 2021/0012591 | A1 | 1/2021 | Mitani et al. |
| 2021/0142146 | A1 | 5/2021 | Kale et al. |
| 2022/0317918 | A1* | 10/2022 | Golov ................. G06F 12/0868 |

FOREIGN PATENT DOCUMENTS

| JP | 2019-200603 A | 11/2019 |
| JP | 2020-3836 A | 1/2020 |

* cited by examiner

*Primary Examiner* — Larry T MacKall

(74) *Attorney, Agent, or Firm* — Sughrue Mion, PLLC

(57) ABSTRACT

A storage device includes a nonvolatile memory including a memory cell array and a storage controller configured to receive event data and sensing data from an external device, and store the sensing data in different areas of the memory cell array based on the event data. The memory cell array includes a first memory area configured to store first sensing data from among the sensing data, the first sensing data being associated with a preset event and a second memory area configured to store second sensing data from among the sensing data, the second sensing data being associated with a current event not corresponding to the preset event. A first number of bits stored in each of first memory cells included in the first memory area may be less than a second number of bits stored in each of second memory cells included in the second memory area.

20 Claims, 13 Drawing Sheets

STORAGE DEVICE FOR AUTONOMOUS DRIVING AND OPERATING METHOD THEREOF

CROSS-REFERENCE TO RELATED APPLICATIONS

This application is based on and claims priority under 35 U.S.C. § 119 to Korean Patent Application Nos. 10-2021-0158932, filed on Nov. 17, 2022, and 10-2022-0040207, filed on Mar. 31, 2022, in the Korean Intellectual Property Office, the disclosures of which are incorporated by reference herein in their entireties.

BACKGROUND

1. Field

Example embodiments of the present disclosure relate to a storage device mounted in an autonomous driving vehicle, and more particularly, to a storage device configured to store data during driving of an autonomous driving vehicle, and an operating method thereof.

2. Description of Related Art

An autonomous driving vehicle may refer to a vehicle that recognizes a surrounding environment without driver intervention, determines a driving situation, and controls a vehicle (i.e., autonomously drives to a given destination). Even though the driver does not operate a steering wheel, an accelerator pedal, or a brake, the autonomous driving vehicle may prevent the collision with obstacles on a driving path through various sensors mounted in the autonomous driving vehicle, and may automatically drive to the destination while adjusting a speed and a driving direction depending on a shape of the driving path (e.g., a road).

In autonomous driving, there occurs an issue with identifying a responsible party for an accident in the accident occurrence of the autonomous driving vehicle. Even though there is a difference according to the law of each country, if an accident occurs while the autonomous driving vehicle drives by using an autonomous driving system, the responsibility for the accident may be vested in the maker of the autonomous driving vehicle. However, in the case where the driver intervenes in the driving, while the autonomous driving vehicle is autonomously driving, the responsibility for the accident may be transferred to the driver.

Accordingly, there is a need to secure substantiation information for deciding the subject in which the responsibility for the accident is vested, in the accident occurrence of the autonomous driving vehicle. To this end, the process of storing sensing data obtained while the autonomous vehicle is driving should be first solved or determined. However, the amount of sensing data is large, such that it is inefficient to store all the sensing data. Accordingly, a technology for efficiently storing sensing data while securing substantiation information in the accident occurrence is required.

SUMMARY

Provided a storage device with autonomous driving and an operating method thereof.

Additional aspects will be set forth in part in the description which follows and, in part, will be apparent from the description, or may be learned by practice of the presented embodiments.

According to an aspect of an example embodiment, a storage device may include a nonvolatile memory device including a memory cell array and a storage controller configured to receive event data and sensing data from an external device, and store the sensing data in different areas of the memory cell array based on the event data. The memory cell array may include a first memory area configured to store first sensing data from among the sensing data, the first sensing data being associated with a preset event and a second memory area configured to store second sensing data from among the sensing data, the second sensing data being associated with a current event not corresponding to the preset event. A first number of bits stored in each of first memory cells included in the first memory area may be less than a second number of bits stored in each of second memory cells included in the second memory area.

According to an aspect of an example embodiment, an operation method of a storage device may include receiving event data and sensing data, determining whether a preset event occurs based on the event data, storing, in a first memory area, first sensing data from among the sensing data, the first sensing data being associated with the preset event, based on determining that the preset event occurs, and storing, in a second memory area, second sensing data from among the sensing data, the second sensing data associated with a current event not corresponding to the preset event, based on determining that the preset event does not occur. A first number of bits stored in each of first memory cells included in the first memory area may be less than a second number of bits stored in each of second memory cells included in the second memory area.

According to an aspect of an example embodiment, a storage device may include a first nonvolatile memory device including a first plurality of memory cells, a second nonvolatile memory device including a second plurality of memory cells, and a storage controller configured to receive event data and sensing data from an external device and store the sensing data in the first plurality of memory cells or the second plurality of memory cells based on the event data. First sensing data among the sensing data associated with a preset event from may be stored in the first plurality of memory cells. Second sensing data among the sensing data associated with a current event not corresponding to the preset event may be stored in the second plurality of memory cells. The first nonvolatile memory device may be configured with a read-only register.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Below, embodiments of the present disclosure will be described in detail and clearly to such an extent that one skilled in the art easily carries out the present disclosure. The embodiments described herein are example embodiments, and thus, the inventive concept is not limited thereto and may be realized in various other forms. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

With the possibility of applying advanced driver assistance systems (ADAS) of level 4 or higher, there is an increasing need to check sensing data before and after an accident. There is a possibility that the autonomous driving-related data are mandatorily stored in a black box. Such data may be used to identify the subject of an accident in the event of an accident. For example, when an accident occurs in the autonomous driving mode, a manufacturer of the vehicle may be held responsible for the accident. When an accident occurs in the manual driving mode, the driver may be held responsible for the accident.

According to example embodiments, a storage device may store relevant sensing data when an event occurs during driving. In particular, when a specific event (i.e., a preset event occurs, data sensed during a given time before and after the accident may be stored in a single level cell (SLC) mode and may be accessed only in the read-only mode after the sensing data are stored in the SLC mode. As a result, the sensing data stored in the SLC mode is prevented from being damaged, changed or deleted.

Figure 1:
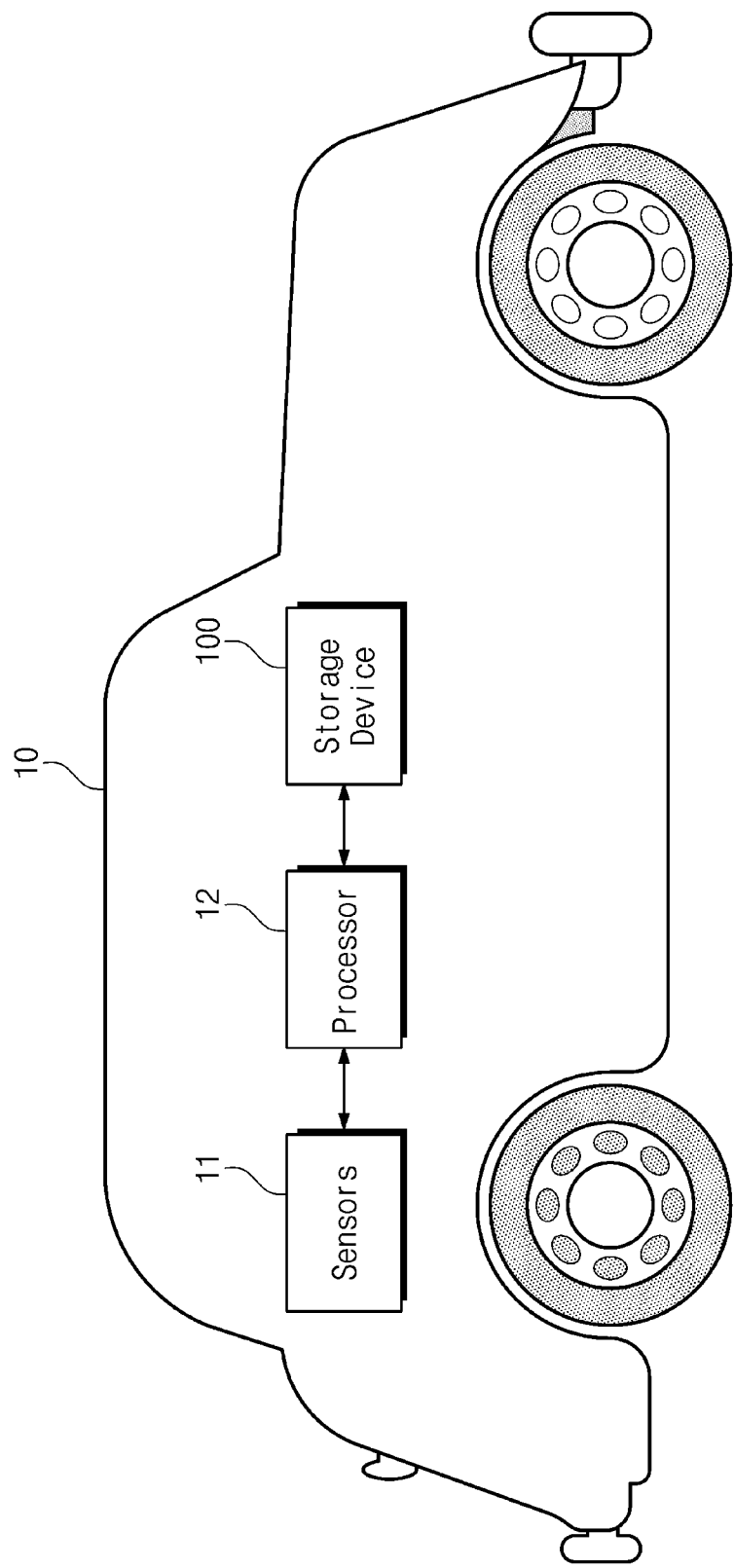
FIG. 1 is a diagram of an autonomous driving vehicle in which a storage device is mounted according to an example embodiment of the present disclosure.

FIG. 1 is a diagram of an autonomous driving vehicle in which a storage device is mounted according to an example embodiment of the present disclosure. Referring to FIG. 1, an autonomous driving vehicle 10 may include a plurality of sensors 11, a processor 12, and a storage device 100.

The autonomous driving vehicle 10 may perform autonomous driving without intervention of the driver by obtaining sensing data through the plurality of sensors 11 and processing the sensing data. The autonomous driving vehicle 10 may store a processing result of the sensing data in the storage device 100. For example, the autonomous driving vehicle 10 may generate event data including event information by processing the sensing data and may store the event data in the storage device 100 together with the sensing data. The sensing data stored in the storage device 100 may be utilized as substantiation information for deciding a subject in which the responsibility for the accident is vested in the accident occurrence of the autonomous driving vehicle 10.

The plurality of sensors 11 may include an object detection device, an internal camera, and a sensing device. The object detection device may detect external objects of the autonomous driving vehicle 10 and may generate sensing data including information about the external objects. For example, the object detection device may include a camera, a radar, a light detection and ranging (LiDAR), and the like. The internal camera may detect a driver or a fellow passenger and may generate sensing data including information about the driver or the fellow passenger. The sensing device may sense a status of the autonomous driving vehicle 10 and may generate sensing data including status information of the autonomous driving vehicle 10. For example, the sensing device may include at least one of an inertial navigation unit (INU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor by steering wheel rotation, a vehicle-in temperature sensor, a vehicle-in humidity sensor, an ultrasonic sensor, an illumination sensor, and an accelerator pedal position sensor, a brake pedal position sensor.

The processor 12 may control an overall operation of at least one electronic device provided in the autonomous driving vehicle 10. That is, the processor 12 may operate as an electronic control unit (ECU). For example, the processor 12 may allow the plurality of sensors 11 to obtain sensing data. Also, the processor 12 may store the sensing data in the storage device 100 or may read the sensing data from the storage device 100.

The processor 12 may process the sensing data to generate specific data. For example, the processor 12 may process the sensing data to generate event data. The event data may refer to information about various events that occur while the autonomous driving vehicle 10 is driving. Table 1 below shows an example of various events.

TABLE 1

| Event type | Details |
| --- | --- |
| Distance warning | Vehicle front and rear detection, maintenance of distances between vehicles, and applicable to ACC (Adaptive Cruise Control) |
| Automatic forward control | Autonomous driving while maintaining a speed and a distance between vehicles set by a driver |
| Prevention of collision | Measures necessary for safety such as automatic braking before occurrence of collision accident |
| Parking assistance | Detection of a distance between vehicles in parking and output of warning sound, by using an ultrasonic sensor |
| Blind spot monitoring | Blind spot detection, prevention of accidents possible upon changing a lane |
| Lane departure warning | Lane and driving direction detection and output of warning sound upon departing from a lane |
| Prevention of drowsiness | Checking of driver's attention and vigilance and warning in an inattentive case |
| Adaptive light | Provision of an optimal headlight state according to a road and a driving direction |
| Night vision | Provision of improved visibility for driver when driving at night |

TABLE 1-continued

| Event type | Details |
| --- | --- |
| Pedestrian monitoring/ avoidance | Provision of warning before pedestrian collision when driving at low speed of 30 km/h or less and provision avoidance |

Table 1 above shows an example of various events, and kinds of events are not limited thereto. For example, various events may include a takeover. The takeover may include the following events in which a driving subject is changed: an event in which the driver operates a steering wheel, an accelerator pedal, or a brake out of a given level during autonomous driving, an event in which autonomous driving is required during manual driving, etc.

The storage device 100 may receive the event data and the sensing data from the processor 12 and may store the received data. According to an embodiment, the storage device 100 may differently determine an area or memory, in which the sensing data are to be stored, based on event data.

For example, the storage device 100 may include a first memory area accessible in a read-only mode, and a second memory area accessible in a normal mode. Sensing data associated with a preset specific event may be stored in the first memory area, and sensing data not associated with the preset specific event may be stored in the second memory area. Herein, a preset event, a specific event, and a preset specific event may be used interchangeably, and the preset specific event may include an event in which the probability of accident occurrence is equal to or greater than a given level. That is, the storage device 100 may store sensing data, which are associated with the specific event in which the probability of accident occurrence is high, in the read-only mode, and thus, the sensing data may be utilized to decide a subject in which the responsibility for an accident is vested in accident occurrence.

According to an embodiment, the preset specific event and sensing data associated with the specific event may change depending on settings. Below, a configuration and an operating method of the storage device 100 will be described.

Figure 2:
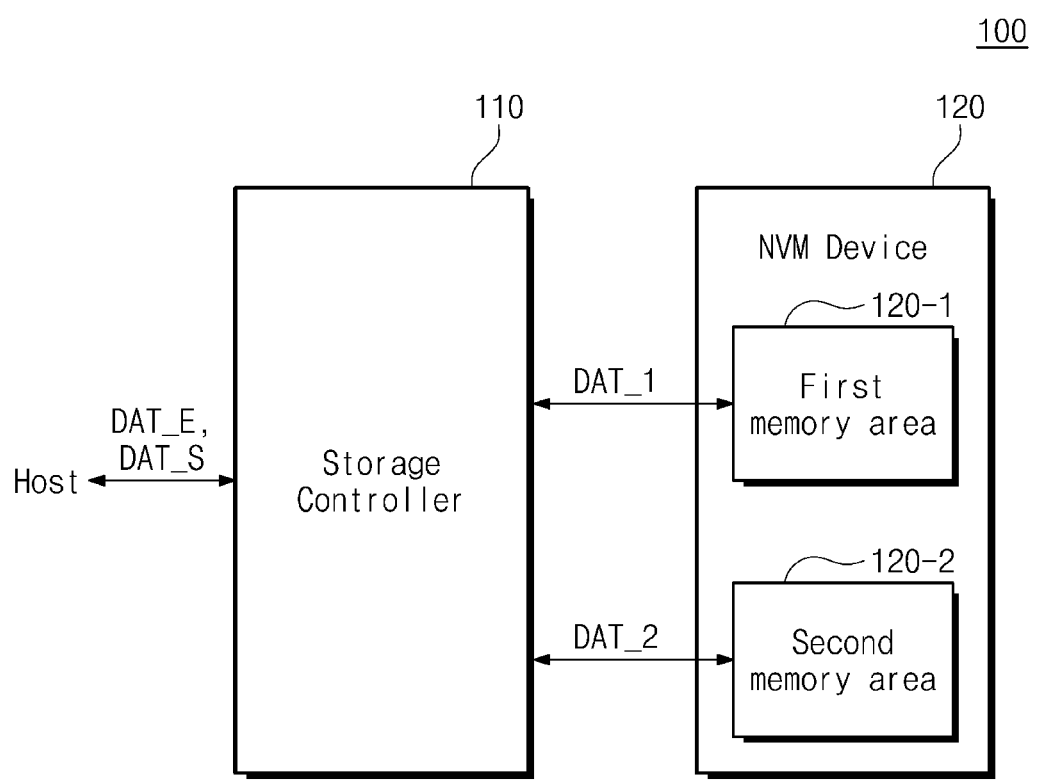
FIG. 2 is a block diagram of a storage device according to an example embodiment of the present disclosure.

FIG. 2 is a block diagram of a storage device according to an example embodiment of the present disclosure. Referring to FIGS. 1 and 2, the storage device 100 may include a storage controller 110 and a nonvolatile memory (NVM) device 120.

The storage controller 110 may be electrically connected with a host. The host may operate as a subject capable of accessing the storage controller 110; for example, the processor 12 may operate as the host. The storage controller 110 may provide a storage service in response to a command received from the host. For example, the host may provide the storage controller 110 with a command including a program request and data including write data, and the storage controller 110 may store the write data in the NVM device 120 in response to the command.

According to an embodiment, the storage controller 110 may receive event data DAT_E and sensing data DAT_S from the host. The storage controller 110 may store the sensing data DAT_S in one of different areas in the NVM device 120 based on the event data DAT_E.

The storage controller 110 may determine whether an event currently occurring (referred to as a "current event" or "occurring event") corresponds to a preset specific event, based on event data. When the current event corresponds to the preset specific event, the storage controller 110 may classify the sensing data DAT_S as first sensing data. The storage controller 110 may store the first sensing data as first data DAT_1 in the NVM device 120. Herein, the first data DAT_1 may be identical to the first sensing data.

When the current event does not correspond to the preset specific event, the storage controller 110 may classify the sensing data DAT_S as second sensing data. The storage controller 110 may store the second sensing data as second data DAT_2 in the NVM device 120. Herein, the second data DAT_2 may refer to data that are obtained by processing the second sensing data. This will be described in detail with reference to FIG. 7.

The NVM device 120 may include a first memory area 120-1 and a second memory area 120-2. The NVM device 120 may store the first data DAT_1 and the second data DAT_2 under control of the storage controller 110. According to an embodiment, the NVM device 120 may store, in the first memory area 120-1, the first data DAT_1 corresponding to the first sensing data having relatively high association with the preset specific event. Also, the NVM device 120 may store, in the second memory area 120-2, the second data DAT_2 corresponding to the second sensing data with relatively low association with the preset specific event.

The first memory area 120-1 may be a memory area accessible in the read-only mode. For example, a write operation or a delete operation for data stored in the first memory area 120-1 may not be permitted. The read only mode may be set in a hardware or software manner. For example, the first memory area 120-1 may be implemented with a read-only register. For another example, the first memory area 120-1 may be an area to which a write protection function is set in compliance with the interface standard.

The second memory area 120-2 may be a memory area accessible in the normal mode. For example, the write operation or the delete operation for data stored in the second memory area 120-2 may be permitted. In response to a write command or a delete command, the storage controller 110 may allow new data to be written in the second memory area 120-2 or may allow existing data to be deleted. According to an embodiment, the storage controller 110 may manage (e.g., write or delete) data stored in the second memory area 120-2 based on time information. This will be described in detail with reference to FIG. 7.

Figure 3:
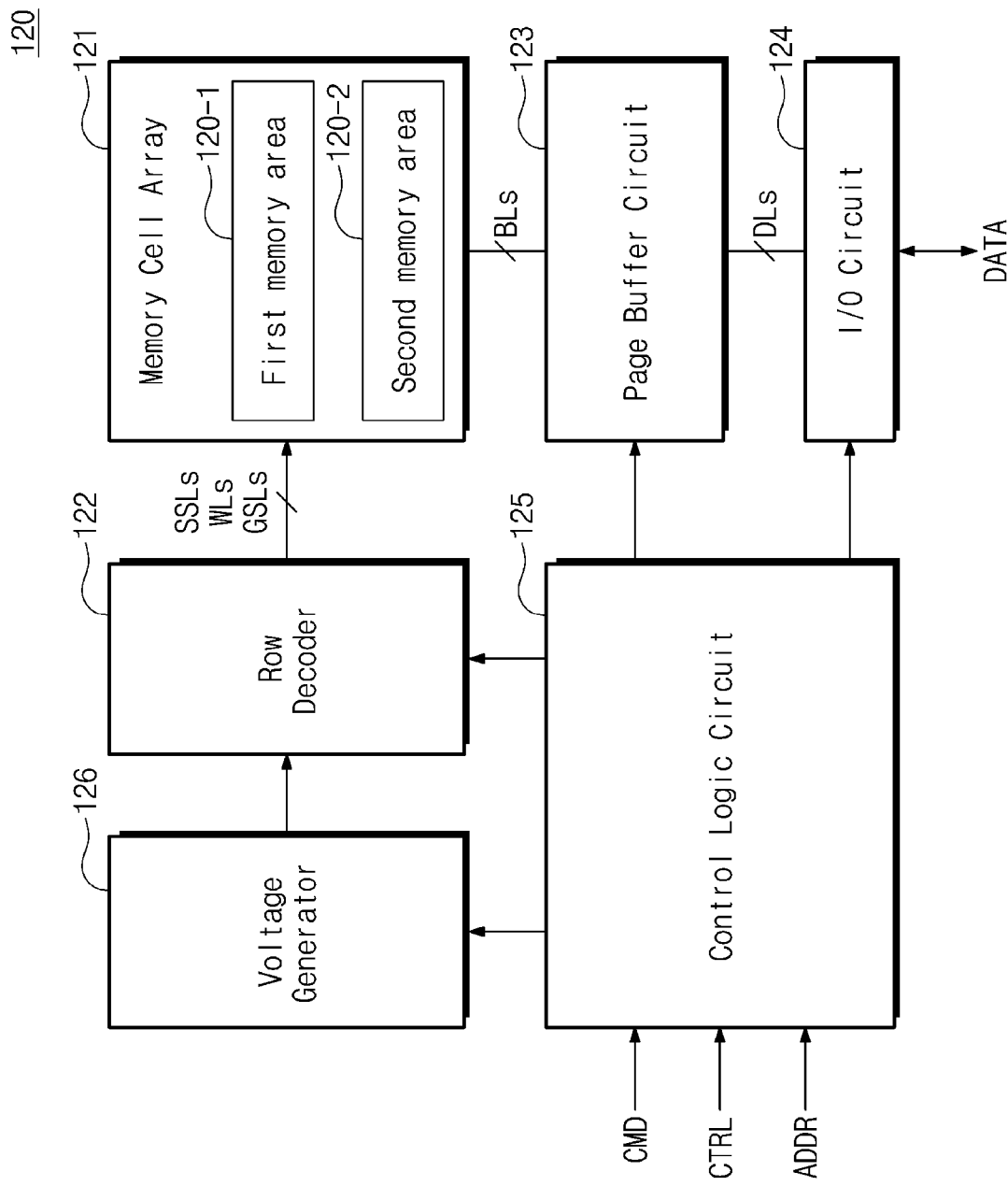
FIG. 3 is a block diagram of an example of a nonvolatile memory (NVM) device of FIG. 2, according to an example embodiment of the present disclosure.

FIG. 3 is a block diagram of an example of an NVM device of FIG. 2, according to an example embodiment of the present disclosure. Referring to FIG. 3, the NVM device 120 may include a memory cell array 121, a row decoder 122, a page buffer circuit 123, an input/output circuit 124, a control logic circuit 125, and a voltage generator 126.

The memory cell array 121 may include the first memory area 120-1 and the second memory area 120-2. The first memory area 120-1 and the second memory area 120-2 may be areas that are classified depending on a memory plane, a memory block, or a word line. For convenience of description, it is assumed that the first memory area 120-1 and the second memory area 120-2 are classified in units of memory block, but the present disclosure is not limited thereto.

Each of the first memory area 120-1 and the second memory area 120-2 may include a plurality of memory cells. The plurality of memory cells may be respectively disposed at intersections of a plurality of word lines WLs and a plurality of bit lines BLs. The plurality of memory cells may be connected with the plurality of word lines WLs, and the memory cell array 121 may be connected with the row decoder 122 through the plurality of word lines WLs.

The plurality of memory cells may constitute a plurality of memory blocks. A memory block will be described in detail with reference to FIG. 4. For example, the first memory area 120-1 may include a first block and a second block, and the second memory area 120-2 may include third to fifth blocks. The number of blocks included in each of the first memory area 120-1 and the second memory area 120-2 may vary depending on an embodiment.

The number of bits of data that each of memory cells included in the first memory area 120-1 stores may be less than the number of bits of data that each of memory cells included in the second memory area 120-2 stores. For example, each of the memory cells included in the first memory area 120-1 may be implemented with a single level cell (SLC) storing 1-bit data. In the specification, below, for convenience of description, it is assumed that each of the memory cells included in the first memory area 120-1 is an SLC storing 1-bit data, but the present disclosure is not limited thereto.

For example, each of the memory cells included in the second memory area 120-2 may be implemented with a multi-level cell (MLC) which may store 2-bit or more data. In the specification, below, for convenience of description, it is assumed that each of the memory cells included in the second memory area 120-2 is a triple level cell (TLC) storing 3-bit data, but the present disclosure is not limited thereto.

The row decoder 122 may be connected with the memory cell array 121 through the plurality of string selection lines SSLs, the plurality of word lines WLs, and the plurality of ground selection lines GSLs. The row decoder 122 may operate under control of the control logic circuit 125. The row decoder 122 may decode an address ADDR under control of the control logic circuit 125. An example in which the control logic circuit 125 receives the address ADDR is illustrated in FIG. 3, but the present disclosure is not limited thereto. The For example, the row decoder 122 may receive the address ADDR from the storage controller 110.

The row decoder 122 may control the plurality of string selection lines SSLs, the plurality of word lines WLs, and the plurality of ground selection lines GSLs based on a decoding result. For example, the row decoder 122 may select at least one of the plurality of word lines WLs based on a control signal of the control logic circuit 125.

The page buffer circuit 123 may be connected with the memory cell array 121 through the plurality of bit lines BLs. The page buffer circuit 123 may store data in the memory cell array 121 by controlling the bit lines BLs. The page buffer circuit 123 may read data stored in the memory cell array 121 by sensing voltages of the bit lines BLs.

The page buffer circuit 123 may output the read data to the input/output circuit 124. For example, the page buffer circuit 123 may receive data from the input/output circuit 124 in units of page or may read data from the memory cell array 121 in units of page.

The page buffer circuit 123 may temporarily store data read from the memory cell array 121 or data to be stored in the memory cell array 121. For example, when a verify read operation associated with an erase operation or a program operation is performed on memory cells connected with a selected word line, the page buffer circuit 123 may sense voltages of the bit lines BLs and may store a sensing result.

The input/output circuit 124 may be connected with the page buffer circuit 123 through a plurality of data lines DLs. The data input/output circuit 124 may output the data read by the page buffer circuit 123 to the storage controller 110 over an output channel and may provide data received from the storage controller 110 over an input channel to the page buffer circuit 123.

The control logic circuit 125 may receive at least one of various kinds of commands CMD, a control signal CTRL, and the address ADDR from the storage controller 110. The control logic circuit 125 may control at least one of the row decoder 122, the page buffer circuit 123, the input/output circuit 124, and the voltage generator 126 in response to a signal received from the storage controller 110.

The voltage generator 126 may generate voltages for performing the erase operation, the program operation, and the read operation on the memory cell array 121. For example, the voltage generator 126 may generate a power supply voltage, an erase voltage, a program voltage, a read voltage, a pass voltage, an erase verify voltage, a program verify voltage, or the like. Also, the voltage generator 126 may generate a string selection line voltage and a ground selection line voltage.

Figure 4:
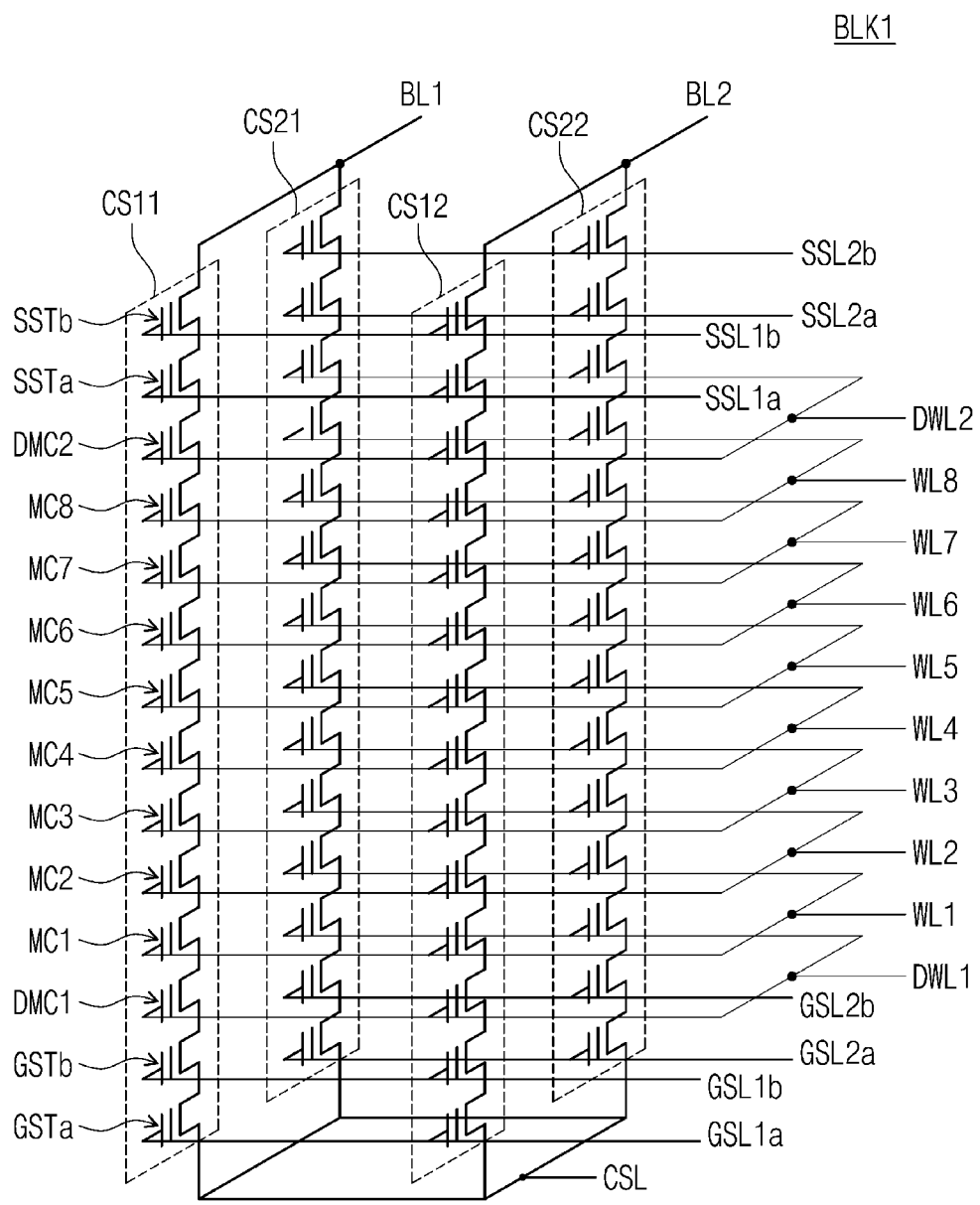
FIG. 4 is a circuit diagram of an example of a memory block included in a memory cell array of FIG. 3, according to an example embodiment of the present disclosure.

FIG. 4 is a circuit diagram of an example of a memory block included in a memory cell array of FIG. 3, according to an example embodiment of the present disclosure. For brevity of drawing and for convenience of description, one memory block BLK1 is illustrated as an example, but the present disclosure is not limited thereto. For example, the remaining memory blocks may be similar in structure to the memory block BLK1 of FIG. 4.

Referring to FIGS. 3 and 4, the first memory block BLK1 may include a plurality of cell strings CS11, CS12, CS21, and CS22. The plurality of cell strings CS11, CS12, CS21, and CS22 may be arranged in a row direction and a column direction. For brevity of drawing, the four cell strings CS11, CS12, CS21, and CS22 are illustrated in FIG. 3, but the disclosure concept is not limited thereto. For example, the number of cell strings may increase or decrease in the row direction or the column direction.

Cell strings placed at the same column from among the plurality of cell strings CS11, CS12, CS21, and CS22 may be connected with the same bit line. For example, the cell strings CS11 and CS21 may be connected with a first bit line BL1, and the cell strings CS12 and CS22 may be connected with a second bit line BL2. Each of the plurality of cell strings CS11, CS12, CS21, and CS22 may include a plurality of cell transistors. Each of the plurality of cell transistors may be implemented with a charge trap flash (CTF) memory cell. The plurality of cell transistors may be stacked in a height direction that is a direction perpendicular to a plane (e.g., a semiconductor substrate) defined by the row direction and the column direction.

The plurality of cell transistors of each cell string may be connected in series between the corresponding bit line (e.g., BL1 or BL2) and the common source line CSL. For example, the plurality of cell transistors may include string selection transistors SSTa and SSTb, dummy memory cells DMC1 and DMC2, memory cells MC1 to MC8, and ground selection transistors GSTa and GSTb. The serially-connected string selection transistors SSTa and SSTb may be provided between the serially-connected memory cells MC1 to MC8 and the corresponding bit line (e.g., BL1 and BL2). The serially-connected ground selection transistors GSTa and GSTb may be provided between the serially-connected memory cells MC1 to MC8 and the common source line CSL. According to an embodiment, the second dummy memory cell DMC2 may be provided between the serially-connected string selection transistors SSTa and SSTb and the serially-connected memory cells MC1 to MC8, and the first dummy memory cell DMC1 may be provided between the serially-connected memory cells MC1 to MC8 and the serially-connected ground selection transistors GSTa and GSTb.

Memory cells placed at the same height from among the memory cells MC1 to MC8 of the plurality of cell strings CS11, CS12, CS21, and CS22 may share the same word line. For example, the first memory cells MC1 of the plurality of cell strings CS11, CS12, CS21, and CS22 may be placed at the same height from the semiconductor substrate and may share the first word line WL1. The second memory cells MC2 of the plurality of cell strings CS11, CS12, CS21, and CS22 may be placed at the same height from the semiconductor substrate and may share the second word line WL2. Likewise, the third memory cells MC3 of the plurality of cell strings CS11, CS12, CS21, and CS22 may be placed at the same height from the substrate and may share a third word line WL3, and the fourth memory cells MC4 of the plurality of cell strings CS11, CS12, CS21, and CS22 may be placed at the same height from the substrate and may share a fourth word line WL4.

Dummy memory cells placed at the same height from among the dummy memory cells DMC1 and DMC2 of the plurality of cell strings CS11, CS12, CS21, and CS22 may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

In the plurality of cell strings CS11, CS12, CS21, and CS22, string selection transistors placed at the same height and the same row from among the string selection transistor SSTa or SSTb of the plurality of cell strings CS11, CS12, CS21, and CS22 may be connected with the same string selection line. For example, the string selection transistors SSTb of the cell strings CS11 and CS12 may be connected with a string selection line SSL1b, and the string selection transistors SSTa of the cell strings CS11 and CS12 may be connected with a string selection line SSL1a. The string selection transistors SSTb of the cell strings CS21 and CS22 may be connected with a string selection line SSL2b, and the string selection transistors SSTa of the cell strings CS21 and CS22 may be connected with a string selection line SSL2a.

In the plurality of cell strings CS11, CS12, CS21, and CS22, ground selection transistors positioned at the same height and the same row from among the ground selection transistors GST1b and GST1a may share the same ground selection line. For example, the ground selection transistors GSTb of the cell strings CS11 and CS12 may be connected with a ground selection line GSL1b, and the ground selection transistors GSTa of the cell strings CS11 and CS12 may be connected with a ground selection line GSL1a. The ground selection transistors GSTb of the cell strings CS21 and CS22 may be connected with a ground selection line GSL2b, and the ground selection transistors GSTa of the cell strings CS21 and CS22 may be connected with a ground selection line GSL2a.

The first memory block BLK1 illustrated in FIG. 4 is an example. The number of cell strings may increase or decrease, and the number of rows of cell strings and the number of columns of cell strings may increase or decrease depending on the number of cell strings. Also, in the first memory block BLK1, the number of cell transistors may increase or decrease, and the height of the first memory block BLK1 may increase or decrease depending on the number of cell transistors. Also, the number of lines connected with cell transistors may increase or decrease depending on the number of cell transistors.

Figure 5A:
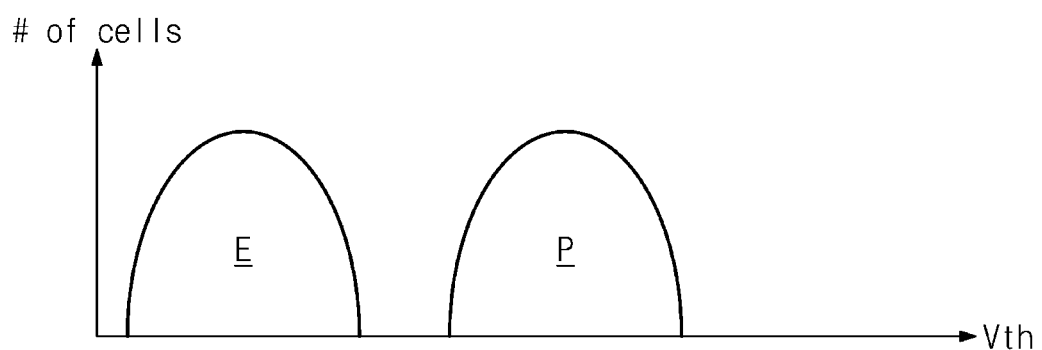
FIGS. 5A and 5B are distribution diagrams of memory cells included in a memory cell array of FIG. 3, according to an example embodiment of the present disclosure.
Figure 5B:
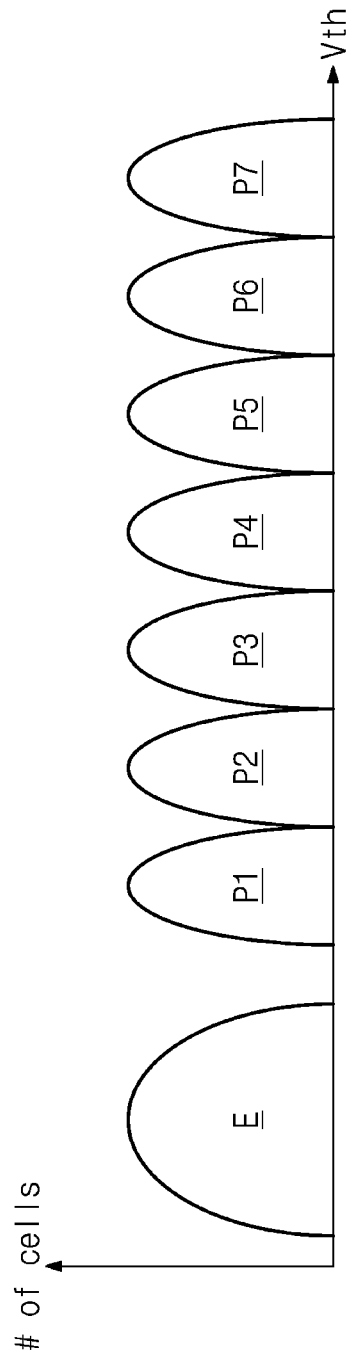

FIGS. 5A and 5B are distribution diagrams of memory cells included in a memory cell array of FIG. 3, according to an example embodiment of the present disclosure. FIG. 5A is a distribution diagram of memory cells included in the first memory area 120-1 of FIG. 3, and FIG. 5B is a distribution diagram of memory cells included in the second memory area 120-2 of FIG. 3. The number of bits of data stored in each of memory cells included in the first memory area 120-1 may be less than the number of bits of data stored in each of memory cells included in the second memory area 120-2. In graphs of FIGS. 5A and 5B, a horizontal axis represents a threshold voltage Vth, and a vertical axis represents the number of memory cells.

Referring to FIGS. 3 and 5A, each of the memory cells of the first memory area 120-1 may store 1-bit data. Each of the memory cells may have one of an erase state "E" and a program state "P" depending on data stored therein. The erase state "E" may indicate a threshold voltage distribution of memory cells that are not programmed, and the program state "P" may indicate a threshold voltage distribution of memory cells that are programmed.

Referring to FIGS. 3 and 5B, each of the memory cells of the second memory area 120-2 may store 3-bit data. Each of the memory cells may have one of the erase state "E" and first to seventh program states P1 to P7 depending on data stored therein. According to an embodiment, each of the memory cells of the second memory area 120-2 may store 2-bit data or 4-bit data.

Referring to FIGS. 5A and 5B, the first memory area 120-1 may store data bits that are less in number than the second memory area 120-2, but may store data to be relatively safe. Accordingly, data stored in the memory cells of the first memory area 120-1 may store sensing data relatively safely in the accident occurrence. Because the second memory area 120-2 stores data bits, the number of which is more than the first memory area 120-1, the second memory area 120-2 may store sensing data efficiently.

Figure 6:
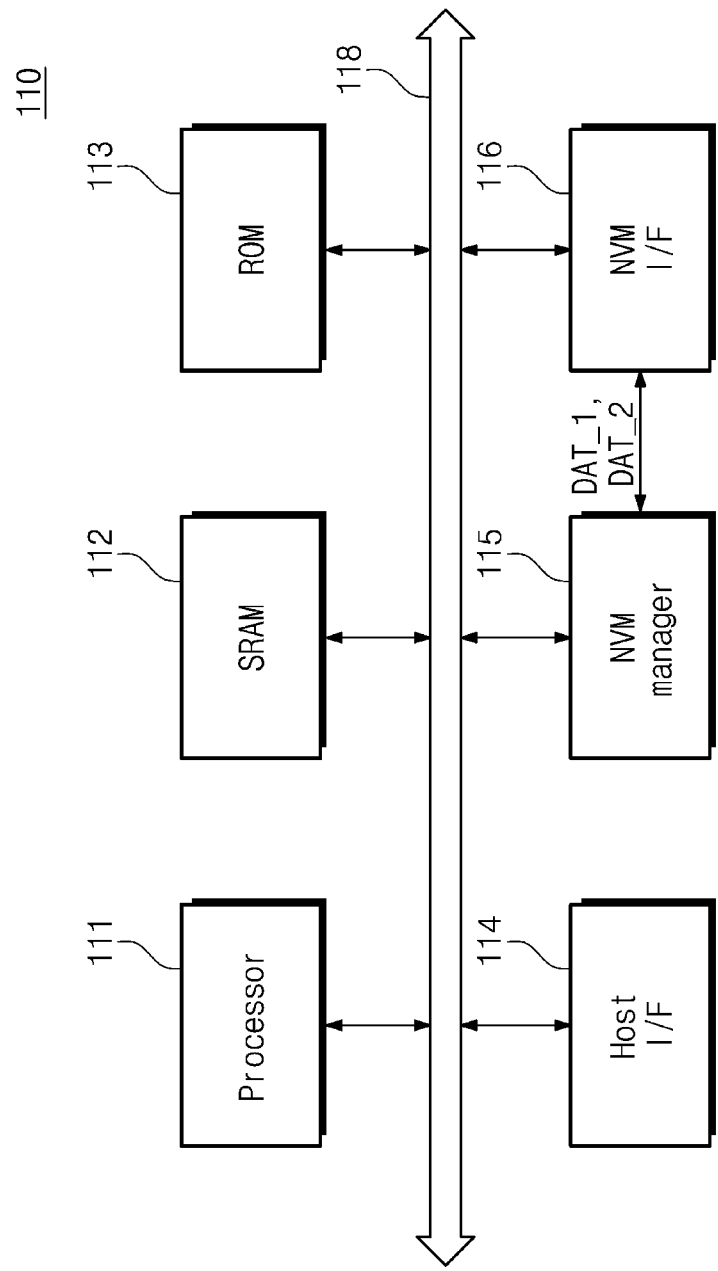
FIG. 6 is a block diagram of an example of a storage controller of FIG. 2 according to an example embodiment of the present disclosure.

FIG. 6 is a block diagram of an example of a storage controller of FIG. 2 according to an example embodiment of the present disclosure. Referring to FIGS. 2 and 6, the storage controller 110 may include a processor 111, a static random access memory (SRAM) 112, a read-only memory (ROM) 113, a host interface (I/F) 114, an NVM manager 115, and an NVM I/F 116.

The processor 111 may control an overall operation of the storage controller 110. The processor 111 may execute firmware for driving the storage controller 110. The firmware may be loaded and executed onto the SRAM 112.

Software or firmware for controlling the storage controller 110 may be loaded onto the SRAM 112. For example, a flash translation layer (FTL) may be loaded onto the SRAM 112. The SRAM 112 may be used as a buffer memory, a cache memory, or a working memory of the storage controller 110.

According to an embodiment, flag information may be stored in the SRAM 112. The flag information may include information indicating whether a corresponding memory block (or memory area) is a read-only block. The processor 111 may identify a memory block, in which specific data readable in the read-only mode are stored, by using a flag.

For example, in a memory block where the first data DAT_1 are stored, the processor 111 may set flag "1" to the memory block when the first data DAT_1 are stored. In a memory block where the second data DAT_2 are stored, the processor 111 may set flag "0" to the memory block when the second data DAT_2 are stored. When a write command or a delete command for a memory block to which flag "1" is set, the processor 111 may not perform the write operation or the delete operation. That is, data stored in a memory block to which flag "1" is set may be protected.

As described herein, the expression that the write operation or the delete operation is not performed may refer to a scenario where data are not changed by a normal write or delete operation executable without a special authority (i.e., write and delete operations are not entirely impossible, but are not executable through ordinary memory access mechanisms). That is, data stored in the first memory area 120-1 may be protected unless specially requested. According to an embodiment, to change or delete data stored in the first memory area 120-1, the storage device 100 may request user's confirmation.

The ROM 113 may store a variety of information, which is necessary for the storage controller 110 to operate, in the form of firmware. For example, code data for performing an interface with the flash translation layer or the host may be stored in the ROM 113.

The host interface 114 may provide an interface between the host and the storage controller 110. The storage controller 110 may communicate with an external device (e.g., a host or an application processor) through the host interface 114. For example, the host interface 114 may include at least one of various interfaces such as universal serial bus (USB), multimedia card (MMC), embedded MMC (eMMC), peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), Firewire, universal flash storage (UFS), and NVM express (NVMe).

The NVM manager 115 may classify and process the sensing data DAT_S so as to be stored in the NVM device 120 through the NVM interface 116. The NVM manager 115 may classify the sensing data DAT_S as first sensing data DAT_S1 or second sensing data DAT_S2.

According to an embodiment, when it is determined based on event data that a current event corresponds to the preset specific event, the first sensing data DAT_S1 may include sensing data associated with the specific event. For example, when the preset specific event is a takeover event, the first sensing data DAT_S1 may include sensing data obtained by a steering sensor, an accelerator pedal position sensor, a brake pedal position sensor, and the like.

According to an embodiment, when it is determined based on event data that a current event does not correspond to the preset specific event, the second sensing data DAT_S2 may include sensing data associated with the current event. For example, when the preset specific event is the takeover event and the current event is a distance warning event, the second sensing data DAT_S2 may include camera data, position data, ACC-related data, and the like.

The NVM manager 115 may store the first sensing data DAT_S1 as the first data DAT_1 in the first memory area 120-1 of the NVM device 120. The NVM manager 115 may control the NVM device 120 such that the access to the first memory area 120-1 is possible only in the read-only mode. According to an embodiment, after the first data DAT_1 are stored in the first memory area 120-1, the NVM manager 115 may respond to only the read command of the host.

The NVM manager 115 may process the second sensing data DAT_S2 into the second data DAT_2, and may store the second data DAT_2 in the second memory area 120-2 of the NVM device 120. The NVM manager 115 may control the NVM device 120 such that the access to the second memory area 120-2 is possible in the read-only mode or the normal mode. According to an embodiment, even after the second data DAT_2 are stored in the second memory area 120-2, the NVM manager 115 may respond to the read command, the write command, and the delete command of the host.

The NVM interface 116 may receive the first data DAT_1 and the second data DAT_2 from the NVM manager 115 and may provide the first data DAT_1 and the second data DAT_2 thus received to the NVM device 120. The storage controller 110 may communicate with the NVM device 120 through the NVM interface 116. For example, the NVM interface 116 may include a NAND interface.

The components of the storage controller 110 may be connected with each other over a data bus 118. The data bus 118 may include a plurality of channels, and the plurality of channels may include independent communication paths, respectively. Each of the plurality of channels may exchange data or signals with devices connected therewith, based on the same communication manner.

Figure 7:
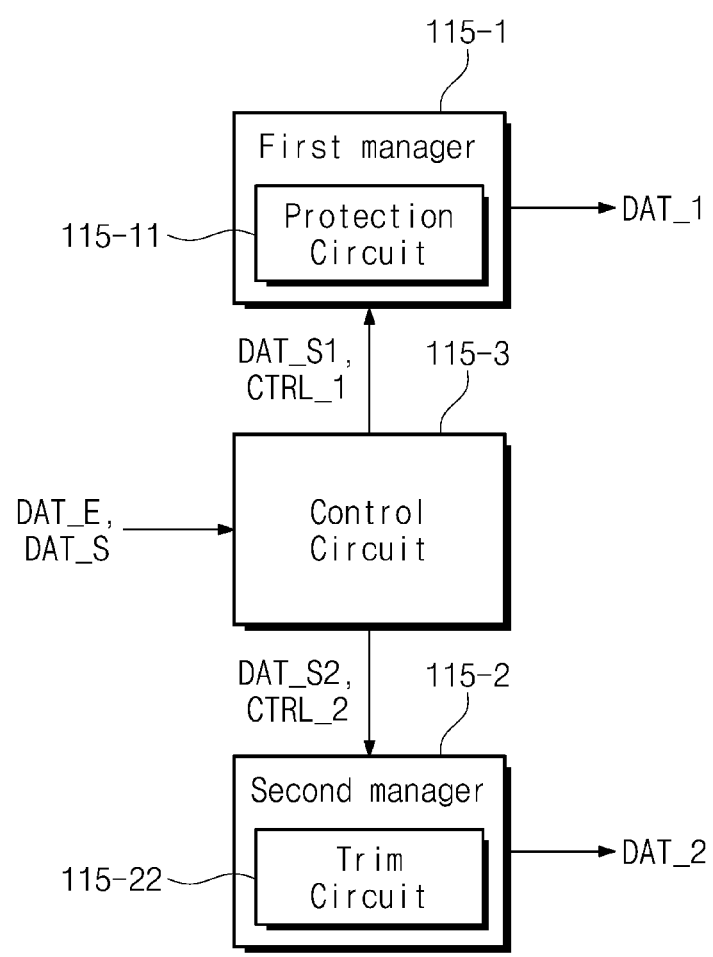
FIG. 7 is a block diagram of an example of an NVM manager of FIG. 6 according to an example embodiment of the present disclosure.

FIG. 7 is a block diagram of an example of an NVM manager of FIG. 6 according to an example embodiment of the present disclosure. Referring to FIGS. 6 and 7, the NVM manager 115 may include a first manager 115-1, a second manager 115-2, and a control circuit 115-3.

The first manager 115-1 may receive the first sensing data DAT_S1 and may store the first sensing data DAT_S1 in the NVM device 120. For example, the first manager 115-1 may store the first sensing data DAT_S1 as the first data DAT_1 in the first memory area 120-1 of the NVM device 120. Herein, the first data DAT_1 may be identical to the first sensing data DAT_S1.

The first manager 115-1 may include a protection circuit 115-11. The protection circuit 115-11 may operate based on a first control signal CTRL_1 of the control circuit 115-3. The protection circuit 115-11 may protect the first data DAT_1 such that the first data DAT_1 is accessible only in the read-only mode. For example, in the read-only mode, the protection circuit 115-11 may block the access to the first memory area 120-1 with respect to the write or delete request for the first memory area 120-1. In the read-only mode, the protection circuit 115-11 may permit the access to the first memory area 120-1 only with respect to the read request for the first memory area 120-1. That is, the read-only mode may mean an operating mode in which only the read operation for the first memory area 120-1 is activated.

According to an embodiment, the first memory area 120-1 may be implemented in the form of hardware, that is, may be implemented with a read-only register. In this case, the protection circuit 115-11 may be omitted.

The second manager 115-2 may receive the second sensing data DAT_S2 and may store the second sensing data DAT_S2 in the NVM device 120. For example, the second manager 115-2 may store the second sensing data DAT_S2 as the second data DAT_2 in the second memory area 120-2 of the NVM device 120. Herein, the second data DAT_2 may include the second sensing data DAT_S2.

The second manager 115-2 may process the second sensing data DAT_S2 to generate the second data DAT_2. For example, the second manager 115-2 may generate the second data DAT_2 by adding time information to the second sensing data DAT_S2. According to an embodiment, the second data DAT_2 may include the second sensing data DAT_S2 and a timestamp.

The second manager 115-2 may include a trim circuit 115-22. The trim circuit 115-22 may operate based on a second control signal CTRL_2 of the control circuit 115-3. The trim circuit 115-22 may delete the second data DAT_2 based on the time information of the second data DAT_2, without an external command. For example, the trim circuit 115-22 may delete the second data DAT_2 or the second sensing data DAT_S2 corresponding to the oldest time information based on the time information. In this case, a free storage space of the second memory area 120-2 may be maintained to be equal to or greater than a given space.

According to an embodiment, the trim circuit 115-22 may delete the second data DAT_2 or the second sensing data DAT_S2 whose elapsed time (e.g., elapsed time from stored in the second memory area 120-2) exceeds the given time, based on the time information. As the trim circuit 115-22 deletes old data even without a delete request from an external device, the second memory area 120-2 may utilize a storage space efficiently.

The control circuit 115-3 may receive the event data DAT_E and the sensing data DAT_S. The control circuit 115-3 may classify the sensing data DAT_S based on the event data DAT_E. For example, the control circuit 115-3 may determine whether a current event corresponds to the preset specific event, based on the event data DAT_E. The control circuit 115-3 may provide the first manager 115-1 with the first sensing data DAT_S1 associated with the specific event, based on determining that the current event corresponds to the preset specific event. The control circuit 115-3 may provide the second manager 115-2 with the second sensing data DAT_S2 associated with the current event, based on determining that the current event does not correspond to the preset specific event.

According to an embodiment, the operation of classifying the first sensing data DAT_S1 and the second sensing data DAT_S2 may be performed by the processor 111 of FIG. 6 or the processor 12 of FIG. 1. In this case, the control circuit 115-3 may play a role of receiving the first sensing data DAT_S1 and the second sensing data DAT_S2 and providing the first sensing data DAT_S1 and the second sensing data DAT_S2 to the first manager 115-1 and the second manager 115-2.

The control circuit 115-3 may generate the first control signal CTRL_1 for controlling the protection circuit 115-11. The control circuit 115-3 may provide the first control signal CTRL_1 to the protection circuit 115-11, and the protection circuit 115-11 may protect the first data DAT_1 stored in the first memory area 120-1 based on the first control signal CTRL_1.

The control circuit 115-3 may generate the second control signal CTRL_2 for controlling the trim circuit 115-22. The control circuit 115-3 may provide the second control signal CTRL_2 to the trim circuit 115-22, and the trim circuit 115-22 may delete the second data DAT_2 stored in the second memory area 120-2 based on the second control signal CTRL_2.

Figure 8:
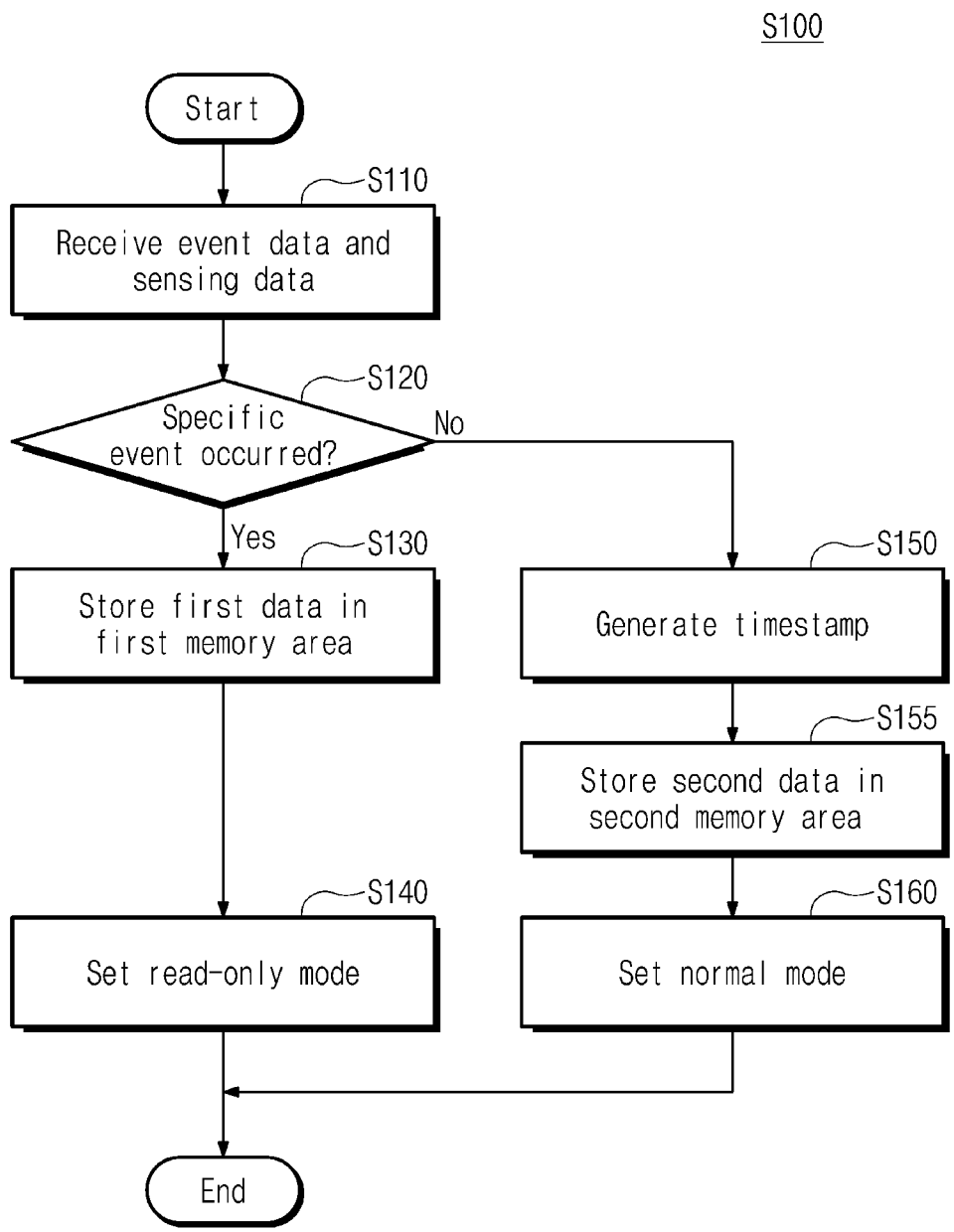
FIG. 8 is a flowchart of an operating method of a storage device according to an example embodiment of the present disclosure.

FIG. 8 is a flowchart of an operating method of a storage device according to an example embodiment of the present disclosure. Referring to FIGS. 2 and 8, an operating method S100 of the storage device 100 may include operation S110 to operation S160.

In operation S110, the storage device 100 may receive the event data DAT_E and the sensing data DAT_S from the host. The event data DAT_E may include information about a plurality of events occurring in driving, and the sensing data DAT_S may include external object information, driver or fellow passenger information, and vehicle status information obtained from the object detection device, the internal camera, and the sensing device.

In operation S120, the storage device 100 may determine whether the specific event occurs, based on the event data DAT_E. Information about the specific event may be information that is set and stored in advance. The storage device 100 may extract a current event based on event data, and may determine whether the current event corresponds to the specific event. When the current event corresponds to the specific event, the storage device 100 may determine that the specific event occurs. When the current event does not correspond to the specific event, the storage device 100 may determine that the specific event does not occur.

In operation S130, the storage device 100 may store first sensing data, based on determining that the specific event occurs. The first sensing data may include sensing data associated with the specific event. For example, the first sensing data may mean sensing data obtained within a given time range when the specific event occurs. The storage device 100 may store the first sensing data associated with the specific event in the first memory area 120-1. According to an embodiment, the first sensing data may be referred to as the "first data DAT_1".

According to an embodiment, the first memory area 120-1 may include a first memory block. The storage device 100 may store the first data DAT_1 in a plurality of memory cells of the first memory block in an SLC programming manner. That is, the number of bits stored in each of the memory cells of the first memory area 120-1 may be "1".

In operation S140, the storage device 100 may set the read-only mode. According to an embodiment, the storage device 100 may enter the read-only mode after storing the first data DAT_1 in the first memory area 120-1. In the read-only mode, the first data DAT_1 stored in the first memory area 120-1 may not be again programmed or deleted. That is, the storage device 100 may protect the first data DAT_1 in the read-only mode.

In operation S150, the storage device 100 may generate second data, based on determining that the specific event does not occur. The second data DAT_2 may be data that are obtained by adding time information to the sensing data. The second sensing data may include sensing data that are not associated with the specific event. For example, the second sensing data may include sensing data obtained within a given time range when a current event being not the specific event occurs. For example, timestamp data may include time information, and the second data DAT_2 may include the second sensing data and the timestamp data.

In operation S155, the storage device 100 may store the second data DAT_2. The storage device 100 may store the second data DAT_2, which include the second sensing data and the timestamp data associated with the current event, in the second memory area 120-2.

Figure 9:
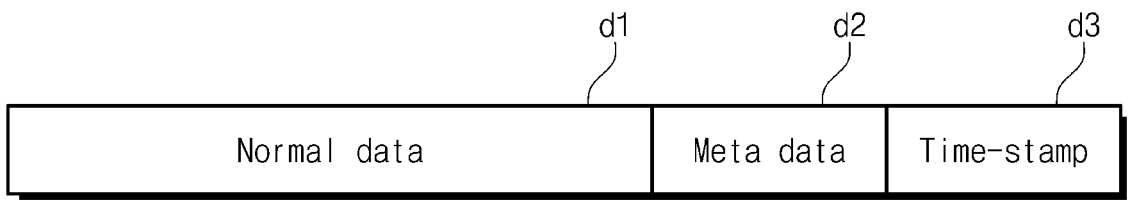
FIG. 9 is a diagram of an example of data generated in operation S155 of FIG. 8 according to an example embodiment of the present disclosure.

FIG. 9 is a diagram of an example of data generated in operation S155 of FIG. 8 according to an example embodiment of the present disclosure. For example, referring to FIG. 9, the second data DAT_2 may include normal data d1, metadata d2, and timestamp data d3. The normal data d1 and the metadata d2 may constitute the second sensing data, and may constitute the second data DAT_2 by the timestamp data d3 added to the second sensing data.

According to an embodiment, the second memory area 120-2 may include a second memory block. The storage device 100 may store the second data DAT_2 in a plurality of memory cells included in the second memory block in a MLC programming manner, a TLC programming manner, or a quadruple level cell (QLC) programming manner. That is, the number of bits stored in each of the memory cells of the second memory area 120-2 may be "2" or more.

In operation S160, the storage device 100 may set the normal mode. According to an embodiment, the storage device 100 may store the second data DAT_2 in the second memory area 120-2 in the normal mode. In the normal mode, the second data DAT_2 stored in the second memory area 120-2 may be re-programmed or deleted.

According to an embodiment, the storage device 100 may check a remaining storage space of the second memory area 120-2 in the normal mode. When the remaining storage space of the second memory area 120-2 is equal to or lower than a given level, the storage device 100 may delete a portion of the second data DAT_2. For example, the storage device 100 may delete second sensing data corresponding to the oldest time information based on time information.

According to an embodiment, the storage device 100 may delete the second sensing data whose elapsed time (e.g., elapsed time from stored in the second memory area 120-2) exceeds the given time, based on the time information, in the normal mode. That is, the storage device 100 may automatically delete the second sensing data whose elapsed times exceed the given time, without an external command or request.

Figure 10:
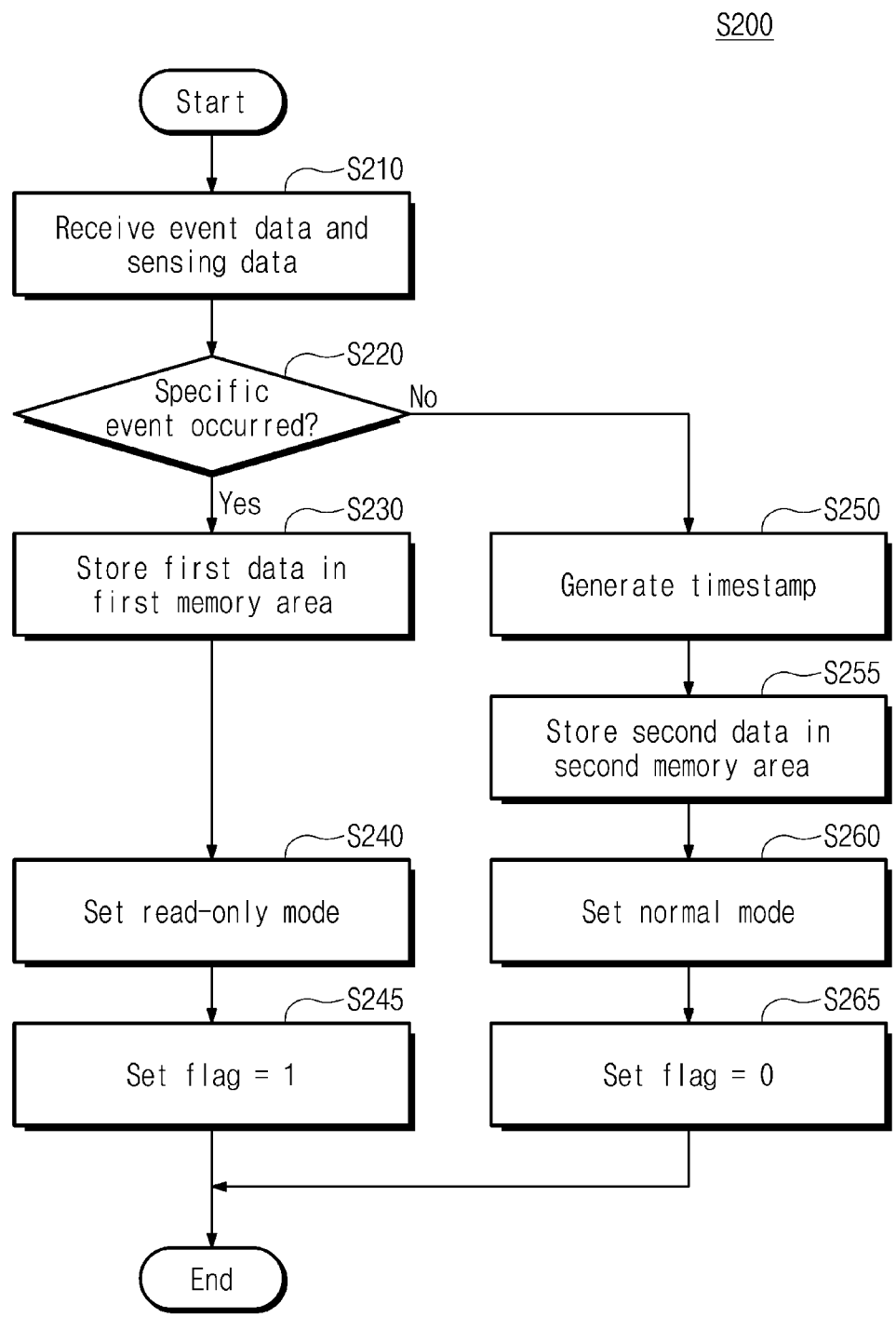
FIG. 10 is a flowchart of an operating method of a storage device according to an example embodiment of the present disclosure.

FIG. 10 is a flowchart of an operating method of a storage device according to an example embodiment of the present disclosure. Referring to FIGS. 2, 9, and 10, an operating method S200 of the storage device 100 may include operation S210 to operation S265. Operation S210, operation S220, operation S230, operation S240, operation S250, operation S255, and operation S260 may be similar to operation S110, operation S120, operation S130, operation S140, operation S150, operation S155, and operation S160 of FIG. 8, respectively, and thus, additional description will be omitted to avoid redundancy.

The storage device 100 may perform a flag setting operation. In operation S245, the storage device 100 may set flag "1" to the first memory area 120-1 in which the first data DAT_1 are stored. Flag "1" may correspond to the read-only mode. When the write or delete request for the first memory area 120-1 is received, the storage device 100 may read a flag set to the first memory area 120-1. When the flag set to the first memory area 120-1 is "1", the storage device 100 may block the write or delete request.

In operation S265, the storage device 100 may set flag "0" to the second memory area 120-2 in which the second data DAT_2 are stored. Flag "0" may correspond to the normal mode. When the write or delete request for the second memory area 120-2 is received, the storage device 100 may read a flag set to the second memory area 120-2. When the flag set to the second memory area 120-2 is "0", the storage device 100 may perform the write or delete operation. Detailed flag setting information may differ depending on an embodiment.

Figure 11:
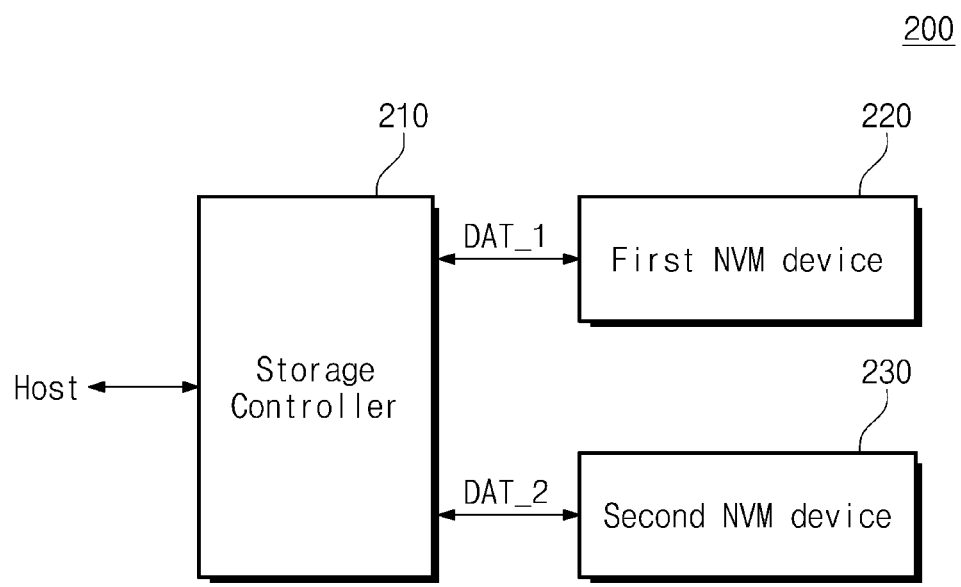
FIG. 11 is a block diagram of a storage device according to an example embodiment of the present disclosure.

FIG. 11 is a block diagram of a storage device according to an example embodiment of the present disclosure. Referring to FIG. 11, a storage device 200 may include a storage controller 210, a first NVM device 220, and a second NVM device 230.

The storage controller 210 may receive event data and sensing data from the host and may store the sensing data in different NVM devices based on the event data. For example, the storage device 200 may select one of the first NVM device 220 and the second NVM device 230 and may store the sensing data in the selected NVM device. The storage controller 210 is similar to the storage controller 110 of FIG. 2, and thus, additional description will be omitted to avoid redundancy.

The first NVM device 220 may include a first plurality of memory cells. First sensing data associated with the preset specific event may be stored in each of the first plurality of memory cells. That is, an operation of the first NVM device 220 may be similar to the operation of the first memory area 120-1 of FIG. 2.

According to an embodiment, the first NVM device 220 may be implemented with a read-only register. Accordingly, the storage controller 210 may store the first data DAT_1 in the first NVM device 220 and may then block the write or delete request for the first NVM device 220.

The second NVM device 230 may include a second plurality of memory cells. Second sensing data associated with a current event not corresponding to the preset specific event may be stored in each of the second plurality of memory cells. That is, an operation of the second NVM device 230 may be similar to the operation of the second memory area 120-2 of FIG. 2.

According to an embodiment, the second data DAT_2 stored in the second NVM device 230 may be deleted based on time information. For example, the storage controller 210 may perform the delete operation on the second data DAT_2 whose elapsed time (e.g., elapsed time from stored in the second memory area 120-2) is equal to or more than the given time, based on the time information of the second data DAT_2. The delete operation for the second data DAT_2 may not be associated with a command or request from the host.

The number of bits stored in each of the first plurality of memory cells may be less than the number of bits stored in each of the second plurality of memory cells. For example, the number of bits stored in each of the first plurality of memory cells may be "1", and the number of bits stored in each of the second plurality of memory cells may be "2" or more.

Figure 12:
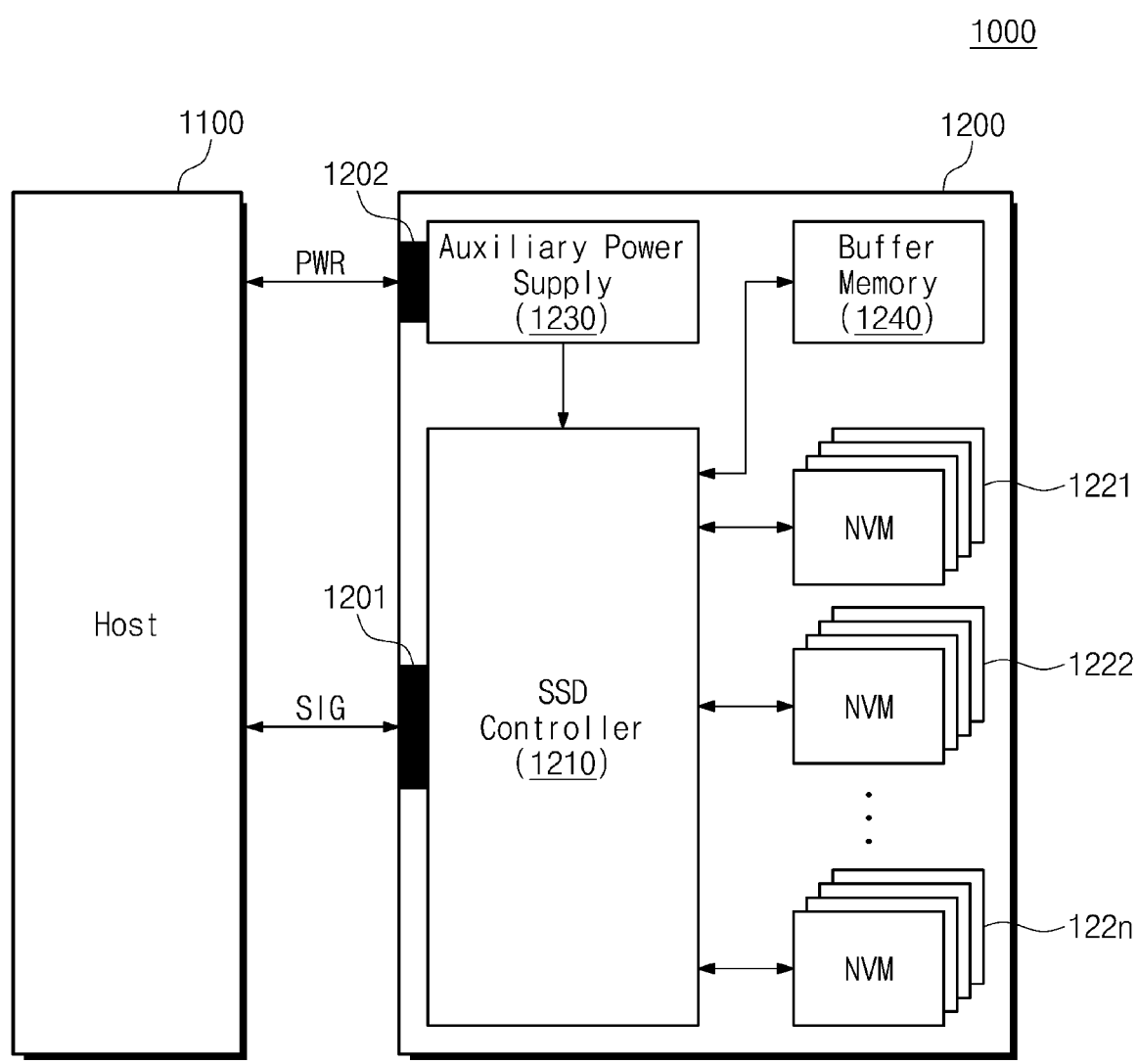
FIG. 12 is a block diagram of an example in which a storage device is applied to a solid state drive (SSD) according to an example embodiment of the present disclosure.

FIG. 12 is a block diagram of an example in which a storage device is applied to a solid state drive (SSD) according to an example embodiment of the present disclosure. Referring to FIG. 12, an SSD system 1000 may include a host 1100 and a storage device 1200. For example, the SSD system 1000 may be a computing system, which is configured to process a variety of information, such as a personal computer (PC), a notebook, a laptop, a server, a workstation, a tablet PC, a smartphone, a digital camera, an autonomous driving vehicle, and a black box.

The host 1100 may control an overall operation of the SSD system 1000. For example, the host 1100 may store data in the storage device 1200 or may read data stored in the storage device 1200. The storage device 1200 may exchange signals SIG with the host 1100 through a signal connector 1201 and may be supplied with a power PWR through a power connector 1202. The storage device 1200 may include an SSD controller 1210, a plurality of nonvolatile memories 1221 to 122n, an auxiliary power supply 1230, and a buffer memory 1240.

The SSD controller 1210 may control the plurality of nonvolatile memories 1221 to 122n in response to the signals SIG received from the host 1100. The plurality of nonvolatile memories 1221 to 122n may operate under control of the SSD controller 1210. The SSD controller 1210 may include the storage controller described with reference to FIGS. 1 to 11.

According to an embodiment, the SSD controller 1210 may classify sensing data and may store the classified sensing data in the plurality of nonvolatile memories 1221 to 122n. The sensing data may include first sensing data associated with the preset specific event and second sensing data not associated with the specific event. The SSD controller 1210 may store the first sensing data in a first NVM to which the SLC programming manner is applied, and may store the second sensing data in a second NVM to which the TLC or QLC programming manner is applied.

The SSD controller 1210 may manage the first NVM in the read-only mode and may manage the second NVM in the normal mode. For example, it may be impossible to perform the program or delete operation on data stored in the first NVM, and it may be possible to perform the program or delete operation on data stored in the second NVM.

First data stored in the first NVM may be used to verify a driving subject upon accident occurrence of the vehicle. Accordingly, the first data may be programmed in the safe SLC programming manner, and the reprogram or delete operation of the first data may be blocked depending on the read-only mode.

Second data stored in the second NVM may be used as normal data for black box. Accordingly the second data may be programmed in the efficient TLC or QLC programming manner, and the reprogram or delete operation of the second data whose elapsed time exceeds the given time may be permitted.

Each of the plurality of nonvolatile memories 1221 to 122*n* may include the NVM device described with reference to FIGS. 1 to 11. Each of the plurality of nonvolatile memories 1221 to 122*n* may classify, store, and manage data based on the method described with reference to FIGS. 1 to 11, and thus, the efficiency of data management may be improved.

A storage device according to an embodiment of the present disclosure may include a storage controller allowing sensing data to be classified and stored and thus may efficiently store sensing data according to an event. Also, through the first sensing data stored in the first memory area, it is possible to assist in determining the driving subject when an accident occurs.

At least one of the components, elements, modules or units (collectively "components" in this paragraph) represented by a block in the drawings such as FIGS. 1-3, 6-7, and 11-12 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
a nonvolatile memory device comprising a memory cell array; and
a storage controller configured to:
receive event data and sensing data from an external device, and
store the sensing data in different areas of the memory cell array based on the event data,
wherein the memory cell array comprises:
a first memory area configured to store first sensing data from among the sensing data, the first sensing data being associated with a preset event; and
a second memory area configured to store second sensing data from among the sensing data, the second sensing data being associated with a current event not corresponding to the preset event,
wherein a first number of bits stored in each of first memory cells included in the first memory area is less than a second number of bits stored in each of second memory cells included in the second memory area, and
wherein the storage controller is further configured to, prior to the sensing data being stored in either of the first memory area and the second memory area of the nonvolatile memory device:
determine whether the preset event occurs based on the event data;
based on determining that the preset event occurs, determine that the sensing data corresponds to the first sensing data, and
based on determining that the current event not corresponding to the preset event occurs, determine that the sensing data corresponds to the second sensing data.

2. The storage device of claim 1, wherein the first number of bits is 1, and the second number of bits is 2 or more.

3. The storage device of claim 1, wherein the storage controller comprises:
a control circuit configured to determine whether the preset event occurs, based on the event data;
a first manager configured to store the first sensing data in the first memory area, based on determining that the preset event occurs; and
a second manager configured to store the second sensing data in the second memory area, based on determining that the current event not corresponding to the preset event occurs.

4. The storage device of claim 3, wherein the first manager is further configured to, after the first sensing data are stored in the first memory area, block a write operation or a delete operation associated with the first memory area.

5. The storage device of claim 3, wherein the second manager is further configured to:
process the second sensing data such that time information is included in the second sensing data; and
store the processed second sensing data in the second memory area.

6. The storage device of claim 5, wherein the second manager comprises a first trim circuit configured to, based on a remaining storage space of the second memory area being equal to or less than a given level, delete first data among the second sensing data corresponding to an oldest time determined from the time information.

7. The storage device of claim 5, wherein the second manager comprises a second trim circuit configured to, based on the time information, delete second data among the second sensing data in which elapsed time of the second data among the second sensing data exceeds a given time.

8. The storage device of claim 1, wherein the first memory area comprises a first memory block, and
wherein the first sensing data are programmed in a plurality of memory cells included in the first memory block in a single level cell (SLC) programming manner.

9. The storage device of claim 8, wherein the second memory area comprises a second memory block, and
wherein the second sensing data are programmed in a plurality of memory cells included in the second memory block in a triple level cell (TLC) programming manner or a quadruple level cell (QLC) programming manner.

10. An operation method of a storage device, the method comprising:
receiving event data and sensing data;
prior to the sensing data being stored in either of a first memory area and a second memory area of a nonvolatile memory device of the storage device:
determining whether a preset event occurs based on the event data;
based on determining that the preset event occurs, determining that the sensing data corresponds to first sensing data; and
based on determining that the preset event does not occur, determining that the sensing data corresponds to second sensing data
storing, in the first memory area, the first sensing data from among the sensing data, the first sensing data being associated with the preset event, based on determining that the preset event occurs; and
storing, in the second memory area, the second sensing data from among the sensing data, the second sensing data associated with a current event not corresponding to the preset event, based on determining that the preset event does not occur,
wherein a first number of bits stored in each of first memory cells included in the first memory area is less than a second number of bits stored in each of second memory cells included in the second memory area.

11. The method of claim 10, wherein the first number of bits is 1, and the second number of bits is 2 or more.

12. The method of claim 10, wherein the determining whether the preset event occurs comprises:
extracting an occurring event based on the event data;
determining whether the occurring event corresponds to the preset event;
based on the occurring event corresponding to the preset event, determining that the preset event occurs; and
based the occurring event not corresponding to the preset event, determining that the preset event does not occur.

13. The method of claim 10, wherein the first memory area comprises a first memory block, and
wherein the storing of the first sensing data in the first memory area includes:
storing the first sensing data in a plurality of memory cells included in the first memory block in a single level cell (SLC) programming manner.

14. The method of claim 13, further comprising setting a read-only mode in which a write operation or a delete operation associated with the first memory block is blocked after the first sensing data are stored in the first memory area.

15. The method of claim 10, wherein the second memory area comprises a second memory block, and
wherein the storing of the second sensing data in the second memory area comprises:
processing the second sensing data such that time information is included in the second sensing data; and
storing the second sensing data in a plurality of memory cells included in the second memory block together with the time information, in a triple level cell (TLC) programming manner or a quadruple level cell (QLC) programming manner.

16. The method of claim 15, wherein the processing of the second sensing data comprises adding timestamp data as the time information to the second sensing data.

17. The method of claim 15, further comprising:
setting a normal mode, and
in the normal mode:
checking a remaining storage space of the second memory area; and
based on the remaining storage space being equal or less than a given level, deleting first data among the second sensing data corresponding to an oldest time determined from the time information.

18. The method of claim 15, further comprising:
setting a normal mode; and
in the normal mode, deleting second data among the second sensing data in which an elapsed time of the second data among the second sensing data exceeds a given time.

19. A storage device comprising:
a first nonvolatile memory device comprising a first plurality of memory cells;
a second nonvolatile memory device comprising a second plurality of memory cells; and
a storage controller configured to:
receive event data and sensing data from an external device, and
store the sensing data in the first plurality of memory cells or the second plurality of memory cells based on the event data,
wherein first sensing data among the sensing data associated with a preset event from are stored in the first plurality of memory cells,
wherein second sensing data among the sensing data associated with a current event not corresponding to the preset event are stored in the second plurality of memory cells,
wherein the first nonvolatile memory device is configured with a read-only register, and
wherein the storage controller is further configured to, prior to the sensing data being stored in either of the first plurality of memory cells and the second plurality of memory cells:
determine whether the preset event occurs based on the event data;
based on determining that the preset event occurs, determine that the sensing data corresponds to the first sensing data, and based on determining that the current event not corresponding to the preset event occurs, determine that the sensing data corresponds to the second sensing data.

20. The storage device of claim 19, wherein a first number of bits stored in each of the first plurality of memory cells is 1, and a second number of bits stored in each of the second plurality of memory cells is 2 or more.

* * * * *